United States Patent
Yoon (10) Patent No.: US 7,809,839 B2
(45) Date of Patent: Oct. 5, 2010

(54) METHOD AND SYSTEM FOR CALL SET-UP BETWEEN MOBILE COMMUNICATION TERMINALS

(75) Inventor: Mi Ja Yoon, Ansan (KR)

(73) Assignee: Pantech Co., Ltd., Seoul (KR)

( * ) Notice: Subject to any disclaimer, the term of this patent is extended or adjusted under 35 U.S.C. 154(b) by 1038 days.

(21) Appl. No.: 11/340,398

(22) Filed: Jan. 25, 2006

(65) Prior Publication Data

US 2006/0165043 A1  Jul. 27, 2006

(30) Foreign Application Priority Data

Jan. 26, 2005  (KR) .................... 10-2005-0007190

(51) Int. Cl.
*G06F 15/16* (2006.01)

(52) U.S. Cl. ................ 709/227; 709/247; 370/328; 370/338; 370/352; 370/389; 455/455; 455/509; 455/515; 455/517; 455/518

(58) Field of Classification Search ............ 709/227; 370/328, 338, 352, 389; 455/436, 509, 515, 455/517, 518, 519

See application file for complete search history.

(56) References Cited

U.S. PATENT DOCUMENTS

| 7,092,721 B2 * | 8/2006 | Harris et al. ............. 455/455 |
| 7,412,541 B1 * | 8/2008 | Stadler et al. ............ 709/247 |
| 2003/0120813 A1 * | 6/2003 | Majumdar et al. ........ 709/247 |
| 2003/0231626 A1 * | 12/2003 | Chuah et al. ............. 370/389 |
| 2004/0192363 A1 | 9/2004 | Rosetti et al. |
| 2005/0078627 A1 * | 4/2005 | Yoon et al. .............. 370/328 |

FOREIGN PATENT DOCUMENTS

| KR | 10-2004-0094275 A | 9/2004 |
| WO | WO 03/073778 A1 | 9/2003 |
| WO | WO 03/084276 A1 | 10/2003 |

* cited by examiner

*Primary Examiner*—Yves Dalencourt
(74) *Attorney, Agent, or Firm*—H.C. Park & Associates, PLC (57) ABSTRACT

A method and system for a call set-up in a mobile communication terminal perform a call set-up using a binary Session Initiation Protocol (SIP) message of short data burst, instead of using a general traffic channel, when a call is set up between the mobile communication terminals on the basis of the SIP. Consequently, it is possible to minimize a delay time required for the call set-up between the mobile communication terminals for providing an SIP signaling protocol service.

11 Claims, 6 Drawing Sheets

```
From: <sip:0114000001@testtims.net>
To: <sip:im.testtims.net>
Content-Type: multipart/mixed;boundary=zFEcpef93c93Fzg --zFEcpef93c93Fzg
Content-Type: application/sdp
Content-Length: ...

v=0
o=0114000001 53655765 2353687637 IN IP4 10.10.1.21
s=IM Conference
t=53655765 0
c=IN IP4 10.10.1.21
m=message 5060 sip sip:0114000001@10.10.1.21:5060

--zFEcpef93c93Fzg
Content-Type: application/conf-info+xml
Content-Length: ...

...(skip)...

<?xml version="1.0"?>
<conf-info>
    <originator id="sip:011900001@testtims.net" service-flag="PTT">
        <display-name>TEST</display-name>
    </originator>
</conf-info>

--zFEcpef93c93Fzg--
```

METHOD AND SYSTEM FOR CALL SET-UP BETWEEN MOBILE COMMUNICATION TERMINALS

CROSS-REFERENCE TO RELATED APPLICATION

This application claims priority under 35 U.S.C. §119(a) from Republic of Korea Patent Application No. 10-2005-0007190, filed on Jan. 26, 2005, the content of which is herein incorporated by reference.

BACKGROUND OF THE INVENTION

1. Field of the Invention

The present invention relates to methods and systems for a call set-up in a mobile communication terminal, and more particularly to methods and systems for a call set-up in a mobile communication terminal adapted to perform a call set-up through a binary Session Initiation Protocol message (SIP message) of short data burst (SDB) when setting up a call using a SIP in the terminal.

2. Description of the Prior Art

In general, a SIP is a text-based protocol used to provide services such as instant message service, Push to Talk (PTT), picture phone, picture conference and the like which are applied to a mobile communication terminal. The SIP can be used to invite a user to all types of sessions including multicast session and point-to-point session. Since the SIP is a text-based protocol, it has advantages that a user can easily comprehend it and it has an easy extensibility. However, since there are no limitations in size and standard, its data capacity is generally large.

In a SIP-based service, a call set-up process passing through nodes such as base stations and switching apparatuses or servers is carried out using a traffic channel. In the call set-up process using the traffic channel, the call set-up is delayed until the traffic channel is activated, thereby causing inconveniences to a user of a mobile communication terminal.

Figure 1:
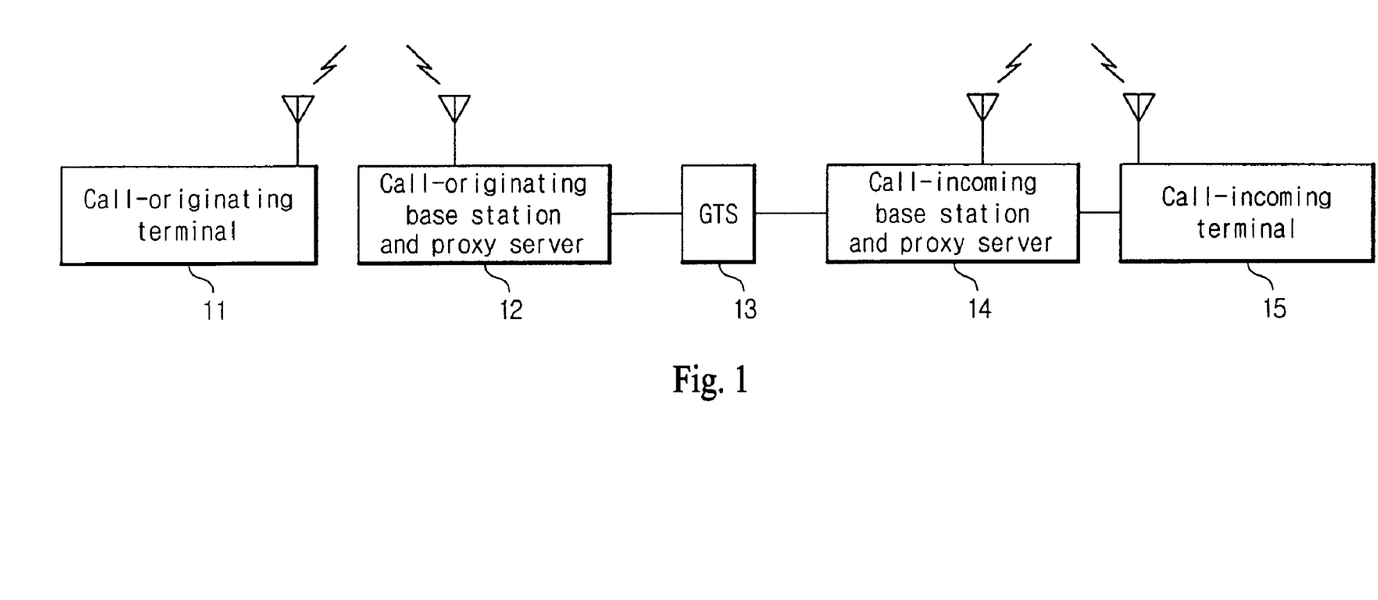
FIG. 1 is a block diagram showing a structure of a network for a call set-up between mobile communication terminals.

FIG. 1 is a block diagram showing a structure of a network for a call set-up between mobile communication terminals. The network for a call set-up between mobile communication terminals may comprise a call-originating terminal 11 trying a call set-up, call-originating base station and proxy server 12, a session resource, i.e., a group talk server (GTS) 13 managing a traffic channel and maintaining and managing a call connection, call-incoming base station and proxy server 14 and a call-incoming terminal 15 receiving a request of the call connection.

Figure 2:
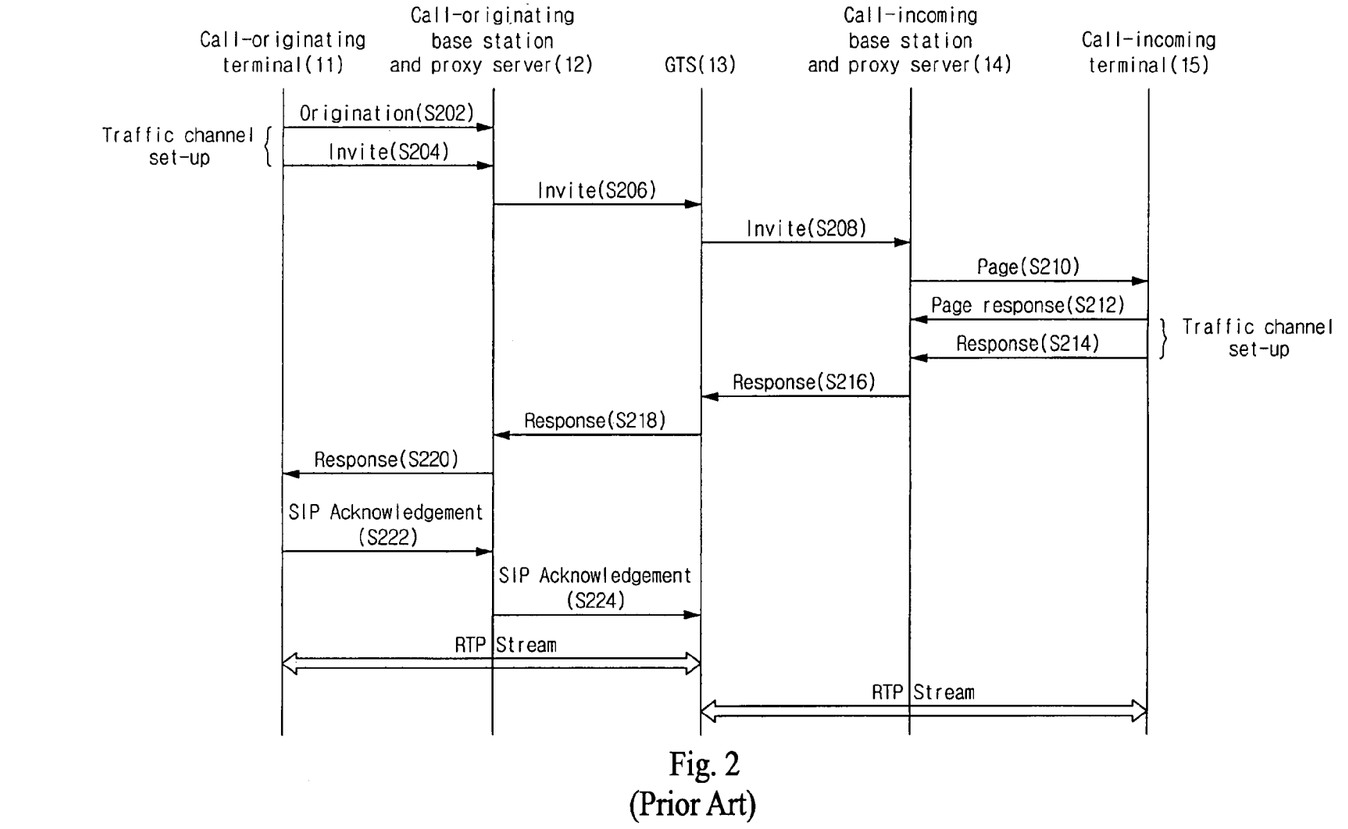
FIG. 2 is a flow chart showing a method for a call set-up between mobile communication terminals according to the prior art.

A method for a call set-up between the mobile communication terminals in the network having the above structure is described with reference to FIG. 2.

First, the call-originating terminal 11 having logged on a point-to-point protocol (PPP) tries an origination to start a traffic channel set-up, under dormant state (S202). After completing the traffic channel set-up, it tries an invite for a call set-up with the call-incoming terminal 15 (S204).

The invite message transmitted from the call-originating terminal 11 is a message of a standard full SIP type and is transmitted to the call-originating base station and proxy server 12 through the traffic channel. At this time, when the traffic channel is activated (it takes about 4~5 seconds), the call-originating terminal 11, which has stood by under dormant state, transmits the invite message to the call-originating base station and proxy server 12 using the activated traffic channel (S204).

The call-originating base station and proxy server 12 having received the invite message routes the invite message to the GTS 13 (S206).

The GTS 13 allots a resource (i.e., traffic channel) regarding the invite of the call-originating terminal 11, and identifies subscriber information of the call-incoming terminal 15 existing in the invite message, and then routes the invite message to the call-incoming base station and proxy server 14 (S208).

The call-incoming base station and proxy server 14 transmits a page to the call-incoming terminal 15 so as to transmit the invite message to the call-incoming terminal 15 standing by under dormant state (S210).

When the call-incoming terminal 15, which is standing by under dormant state, receives the page from the call-incoming base station and proxy server 14, it tries an origination (i.e., a response to the page) so as to process the received page (S212) and is transitioned to the traffic channel activated state. In this case, it takes about 4~5 seconds for the call-incoming terminal 14 to be transitioned from the dormant state to the traffic channel activated state.

When the traffic channel is transitioned to the activated state, the call-incoming terminal 15 receives the invite message of the standard full SIP type from the call-incoming proxy server 14 and transmits a response message to the invite message under state that the traffic channel is activated (S214).

The response message transmitted from the call-incoming terminal 15 is transmitted to the call-originating terminal 11 through the traffic channels under activated state between the call-originating terminal 11 and the base station 12, and between the call-incoming base station 14 and the call-incoming terminal 15 (S214~S220).

The call-originating terminal 11 having received the response message transmits a SIP acknowledgement message to the call-originating base station and proxy server 12 (S222) which in turn transmits the SIP acknowledgement message to the GTS 13 (S224). Then, data transmission is made between the call-originating terminal 11 and the call-incoming terminal 15 through a real-time transport protocol (RTP).

Like this, according to the method for a call set-up between the mobile communication terminals of the prior art, in case that the call-originating terminal 11 tries the call set-up under PPP dormant state that the wireless resource (i.e., traffic channel) is not actually activated, the call-originating terminal 11 does not transmit the invite message until the traffic channel is activated from the dormant state. In addition, in case that the invite message is transmitted to the call-incoming terminal 15 after being routed between the servers, the call-incoming terminal 15 is transitioned to the traffic channel activated state from the dormant state after receiving the page. Like this, it is not possible to freely transmit/receive the final response and media data between the call-originating terminal 11 and the call-incoming terminal 15 until the traffic channel of the call-incoming terminal 15 is activated.

In other words, the method for a call set-up between the mobile communication terminals according to the prior art is a call set-up method using a traffic channel wherein the call set-up is delayed by a time required for each of the call-originating terminal and the call-incoming terminal to be transitioned to the traffic channel activated state from the dormant state. Accordingly, at least 10 seconds may be delayed until the call set-up is actually made, thereby causing considerable inconveniences to a user of a mobile communication terminal. In addition, there may occur a problem in activation of a service itself.

SUMMARY OF THE INVENTION

Accordingly, the present invention has been made to solve the above problems. An object of the invention is to provide methods and systems for setting up a call between mobile communication terminals using a binary SIP message of short data burst (SDB) on the basis of SIP.

Another object of the invention is to set up a call using a binary SIP message of SDB instead of using a general traffic channel when setting up a call between mobile communication terminals on the basis of SIP, thereby minimizing delay of a call set-up time between the mobile communication terminals for providing a SIP signaling protocol service.

Still another object of the invention is to perform a signaling process of a binary SIP message using SDB when carrying out a SIP signaling protocol service, thereby shortening a call set-up time to a minimum.

Yet still another object of the invention is to minimize a call set-up time between mobile communication terminals, thereby minimizing a user's dissatisfaction with delay when using a service and presenting a foundation of a technology required for service generalization.

In order to achieve the above objects, according to an aspect of the invention, there is provided a method for a call set-up between mobile communication terminals comprising steps of: receiving a signaling message for a call set-up with a call-incoming terminal from a call-originating terminal through short data burst (SDB); setting up a traffic channel of the call-originating terminal depending on an origination signal sent by the call-originating terminal after transmitting the signaling message; receiving a response message of the call-incoming terminal to the signaling message; and setting up a traffic channel of the call-incoming terminal depending on an origination signal sent by the call-incoming terminal after transmitting the response message.

According to another aspect of the invention, there is provided a system for a call set-up between mobile communication terminals comprising: call-originating base station and proxy server receiving a signaling message for a call set-up with a call-incoming terminal from a call-originating terminal, receiving an origination signal for a set-up of a traffic channel from the call-originating terminal after receiving the signaling message and setting up the traffic channel of the call-originating terminal depending on the origination signal; call-incoming base station and proxy server transmitting the signaling message to the call-incoming terminal, receiving a response message to the signaling message from the call-incoming terminal, receiving an origination signal for a set-up of a traffic channel from the call-incoming terminal after receiving the response message and setting up the traffic channel of the call-incoming terminal depending on the origination signal; and a GTS intermediating between the call-originating base station and proxy server and the call-incoming base station and proxy server, and transmitting/receiving the signaling message and the response message.

According to the invention, it is intended to minimize an initial session set-up time (i.e., call set-up time) between the call-originating terminal and the call-incoming terminal when using a service such as SIP-based messenger, picture phone, picture conference, PTT and the like, through the SDB provided in a Code Division Multiple Access 1x Release A network ("CDMA 1x Release A network"). In other words, in order to improve a disadvantage that it takes about 10 seconds or more to activate a traffic channel in a call set-up mode through a general traffic channel, the present invention discloses a call set-up using an invite message of a binary SIP type, rather than an invite message of a standard full SIP type.

Figure 3:
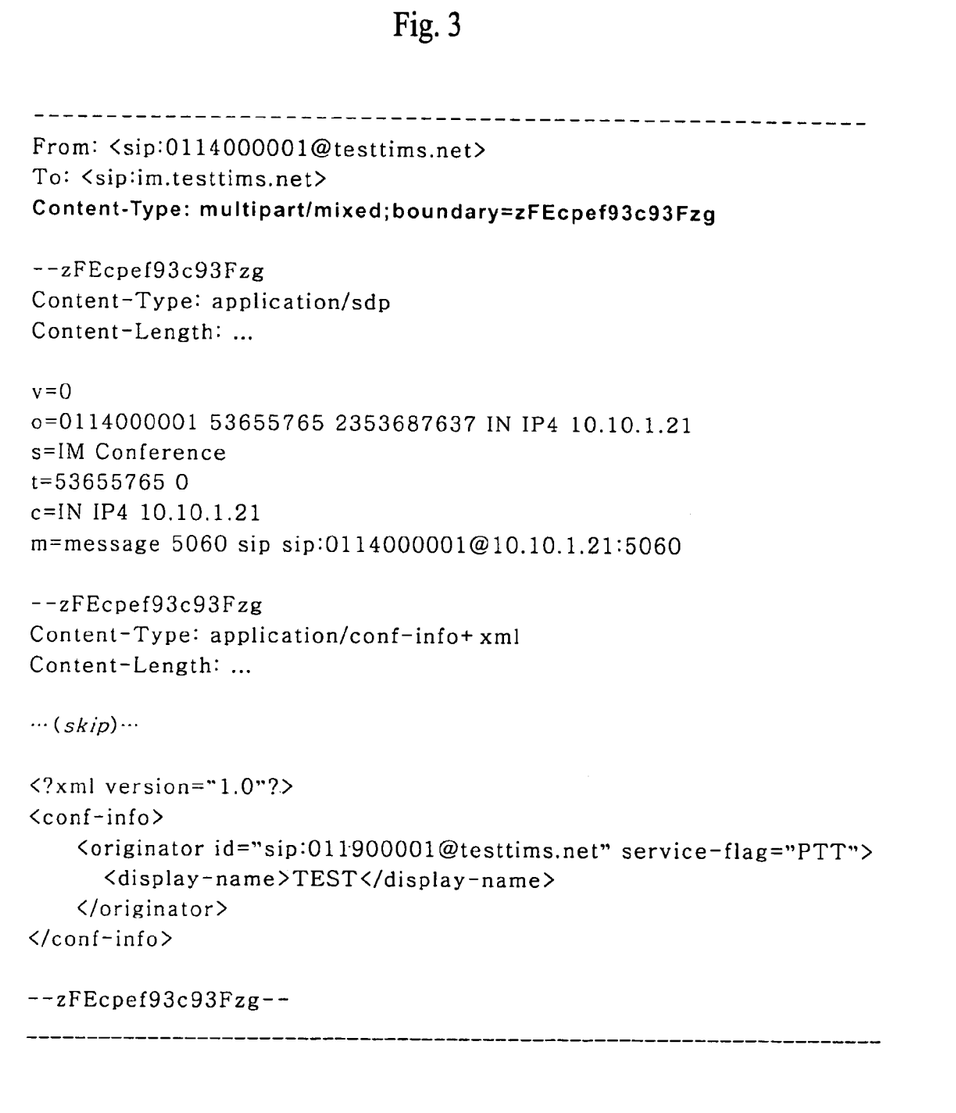
FIG. 3 is an example of an invite message of a standard full SIP type for a call set-up.

For example, an invite message of a standard full SIP type for a call set-up between mobile communication terminals may be structured as shown in FIG. 3. In order to transmit data having a large capacity as the standard full SIP message shown in FIG. 3, a traffic channel of the mobile communication terminal should be set up. Therefore, according to the invention, the invite message for a call set-up is transmitted with the binary SIP type through the SDB, instead of being transmitted with the standard full SIP type through the traffic channel.

The binary SIP message is a message of a minimal reduced type for a call set-up. The binary SIP message is sent through a corresponding SDB to try a call set-up. The call-incoming terminal also performs a response to the invite message through the SDB, thereby making it possible to minimize a call set-up time. By doing so, it is possible for a terminal user to set up a session with much less time.

A corresponding MSS (i.e., proxy server) creates the binary SIP uploaded from the terminal into a standard full SIP message. When transmitting the standard full SIP message sent from the GTS (i.e., PTT server) to the terminal, the standard full SIP message is converted into the binary SIP and then transmitted in case that the corresponding terminal is under dormant state.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, a preferred embodiment of the present invention will be described with reference to the accompanying drawings. In the following description of the present invention, a detailed description of known functions and configurations incorporated herein will be omitted when it may make the subject matter of the present invention rather unclear.

Figure 4:
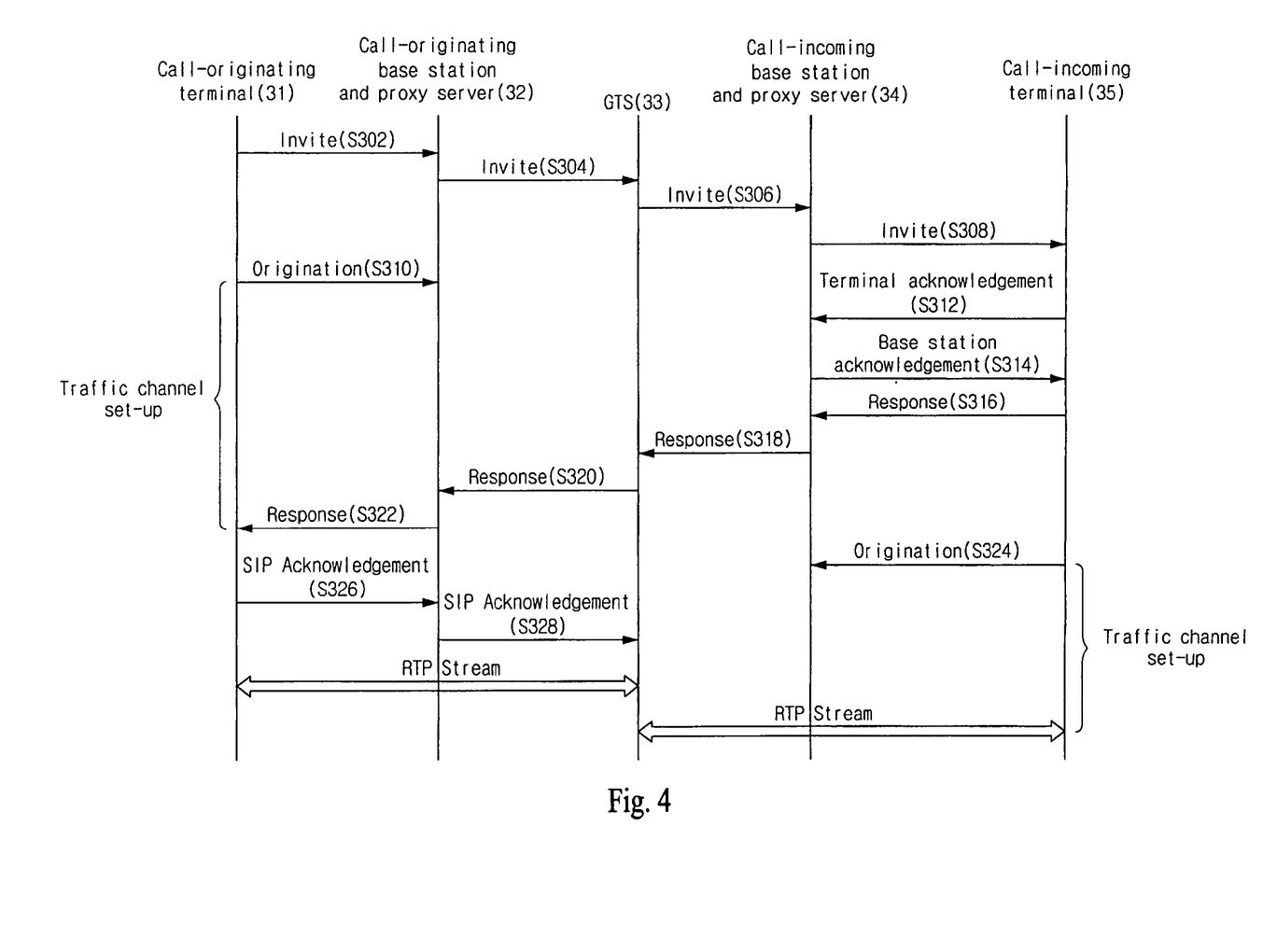
FIG. 4 is a flow chart showing a method for a call set-up between mobile communication terminals according to an embodiment of the invention.

FIG. 4 is a flowchart showing a method for a call set-up between mobile communication terminals according to an embodiment of the invention. In the embodiment of FIG. 4, a call-originating terminal 31 transmits an invite message of a binary SIP type and tries an origination for activating a traffic channel after the transmission of the invite message.

More specifically, the call-originating terminal 31 transmits an invite message of a minimal reduced type for a call set-up such as binary SIP using a SDB function supported in a CDMA 1x Release A network. After transmitting the invite message of the binary SIP type for a call set-up through the SDB, it tries an origination to set up a traffic channel (S310).

Figure 5:
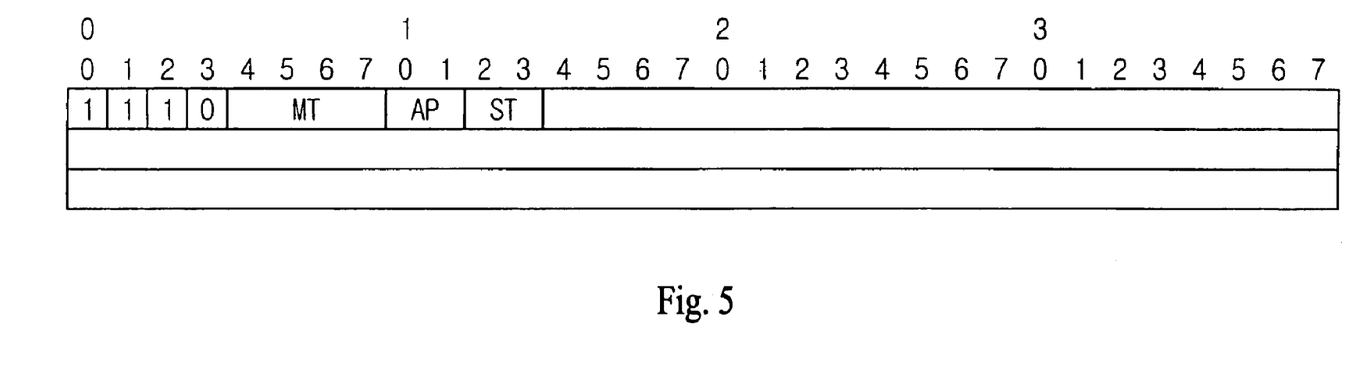
FIG. 5 is a view illustrating a format of a binary SIP in FIG. 3.

The binary SIP may comprise information about MT (Method), AP (Application ID) and ST (Service Type) for PTT, as shown in FIG. 5. The binary SIP is a compressed type of the standard full SIP message transmitted between the MSS (i.e., proxy server) and the terminal. A reduction field may be differently defined according to service providers, and a message size is structured to have a minimal size capable of being transmitted through the SDB.

The invite message sent from the call-originating terminal is transmitted to the call-incoming terminal 35 via the call-originating base station and proxy server 32, the GTS 33 and the call-incoming base station and proxy server 34 (S302~S308).

In this case, the call-originating base station and proxy server 32 receives the invite message of the binary SIP type sent from the call-originating terminal 31, converts it into a message of the standard full SIP type and transmits the converted message to the GTS 33 (S304). In transmitting a response message of the standard full SIP type sent from the GTS 33 to the call-originating terminal 31, the call-originating base station and proxy server converts and then transmits the response message into a message of the binary SIP type if the call-originating terminal 31 is under dormant state (S320).

In the mean time, the call-incoming terminal 35 having received the invite message transmits a terminal acknowledgement message to the call-incoming base station and proxy server 34 (S312). The call-incoming base station and proxy server 34 having received the terminal acknowledgement message transmits a base station acknowledgement message to the call-incoming terminal 35 (S314). The call-incoming terminal 35 having received the base station acknowledgement message sends a response message to the call set-up through the SDB (S316) and then tries an origination to set up a traffic channel.

In the mean time, the response message sent from the call-incoming terminal 35 is transmitted to the call-originating terminal 31 via the call-incoming base station and proxy server 34, the GTS 35 and the call-originating base station and proxy server 32 (S316~S322).

Consequently, it is possible to freely transmit/receive the data between the call-originating and call-incoming parties from after the traffic channel is set up at the call-incoming party, thereby allowing users of the mobile communication terminals to set up a session with much less time.

Figure 6:
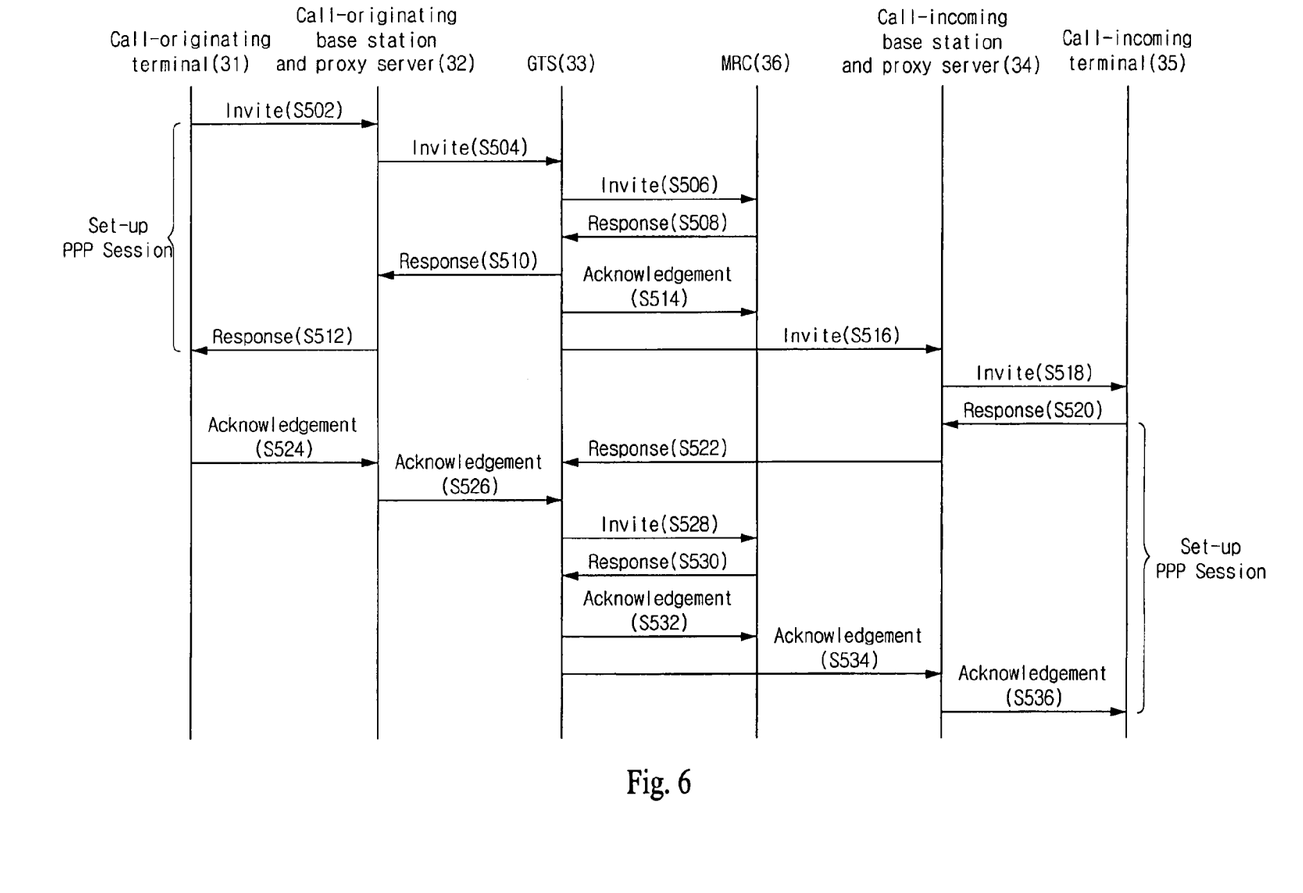
FIG. 6 is a flow chart showing a method for a call set-up between mobile communication terminals according to another embodiment of the invention.

FIG. 6 shows a method for a call set-up between mobile communication terminals according to another embodiment of the invention. FIG. 6 shows a call set-up method in a system having a media resource control server (MRC) 36 added thereto. In this case, the MRC 36 serves to mediate the transmitting/receiving of media data for a call set-up so that a call connection is completely made between the mobile communication terminals 31, 35. The call set-up method shown in FIG. 6 is as follows.

First, the call-originating terminal 31 tries an origination for a call set-up with the call-incoming terminal 35 under state that it is logged on the SIP based service.

At this time, in case that the call-originating terminal 31 is under dormant state, it generates a message of a binary SIP type and transmits an Invite to the call-originating base station and proxy server 32 with the SDB through an access channel using the generated message of the binary SIP type (S502).

At this time, after performing the origination through the corresponding SDB, the call-originating terminal 31 tries an origination for a traffic channel set-up, so that the traffic channel set-up is started and thus a traffic channel is converted into an activated state.

The call-originating base station and proxy server 32 receives the binary SIP message sent from the call-originating terminal 31, converts the received binary SIP message into a standard full SIP message and routes the converted message to the GTS 33 and the MRC 36 (S504, S506).

Consequently, the call-originating terminal 31 is connected to the MRC 36 under state that the traffic channel is activated by the origination. Like this, when the connection is made between the call-originating terminal and the MRC 36, the MRC 36 transmits a response message of a standard full SIP type to the Invite, which is received from the call-originating terminal, to the call-originating terminal 31 whose traffic terminal has been already activated through the corresponding traffic channel, via the GTS 33 and the call-originating base station and proxy server 32 (S508~S512). In this case, when the GTS 33 receives the Invite from the MRC 36, it transmits an acknowledgement signal to the MRC 36 (S514).

In the mean time, the GTS 33 receives the invite from the call-originating terminal 31, simultaneously allots a resource regarding it, checks subscriber information of the call-incoming terminal 35 existing in the received Invite and routes the information to the call-incoming base station and proxy server 34 (S516).

At this time, in case that the call-incoming terminal 35 is logged on the SIP based service and under PPP dormant state, the call-incoming base station and proxy server 34 converts the standard full SIP message into a binary SIP message, and then transmits the converted message to the call-incoming terminal 35 through the SDB (S518).

In transmitting the standard full SIP message sent from the GTS 33 to the call-incoming terminal 35, the call-incoming base station and proxy server 34 checks whether the call-incoming terminal 35 is under dormant state and if so, converts and transmits the corresponding standard full SIP message into the binary SIP message.

Then, the call-incoming terminal 35 receives the Invite with the SDB through the access channel from the call-incoming base station and proxy server 34 and then, immediately transmits a response to the Invite through the SDB (S520). Like this, the response message sent from the call-incoming terminal 35 is transmitted to the GTS 33 via the call-incoming base station and proxy server 34 (S520, S522). An acknowledgement signal for the response message is transmitted from the call-originating terminal 31 to the GTS 33 via the call-originating base station and proxy server 32 (S524, S526).

The GTS 33 having received the acknowledgement signal transmits the Invite to the MRC 36 (S528). When the GTS receives a response message to the Invite (S530), it transmits an acknowledgement signal (S532). The acknowledgement signal transmitted from the GTS 33 is sent to the call-incoming terminal 31 via the MRC 36 and the call-incoming base station and proxy server 34 (S532, S534, S536).

In the mean time, the call-incoming terminal 35 tries the origination to start a traffic channel set-up, so that the traffic channel is converted into an activated state.

At this time, while the call-incoming terminal 35 sets up the traffic channel, the call-originating terminal 31 having already activated the traffic channel and completed a confirmation of the call set-up transmits the acknowledgement signal to the GTS 32 via the call-originating base station and proxy server 32 (S524, S526) and starts the data transmission through the RTP.

While the call-originating terminal 31 transmits the data, the call-incoming terminal 35 performs a response to the call-originating session and is converted into the traffic channel activated state, so that it can receive and play the data transmitted from the call-originating terminal.

In case that the call set-up is performed as described above, it can be seen that the set-up is serially made after the call-originating/incoming terminals are converted from the dormant state to the traffic activated state.

As described above, according to the invention, when setting up a call using a SIP in a mobile communication terminal, the binary SIP message is subject to the signaling process using the SDB, so that it is minimized a delay time in setting up a call between the terminals in the SIP signaling protocol service. Accordingly, it is possible to remove the inconveniences when a user uses the terminal and to provide a technology foundation required for the service generalization.

While the invention has been shown and described with reference to certain preferred embodiments thereof, it will be understood by those skilled in the art that various changes in form and details may be made thereto without departing from the spirit and scope of the invention as defined by the appended claims.

What is claimed is:

1. A method for a call set-up between mobile communication terminals, comprising steps of:
    receiving a signaling message for a call set-up with a call-incoming terminal from a call-originating terminal through short data burst (SDB);
    setting up a traffic channel of the call-originating terminal depending on a first origination signal sent by the call-originating terminal after transmitting the signaling message;
    receiving a response message of the call-incoming terminal to the signaling message; and
    setting up a traffic channel of the call-incoming terminal depending on a second origination signal sent by the call-incoming terminal after transmitting the response message,
    wherein the signaling message is a binary session initiation protocol (SIP) message comprising information about Method (MT), Application ID (AP), and Service Type (ST) for Push-To-Talk session,
    wherein the step of setting up the traffic channel of the call-originating terminal comprises:
    receiving the first origination signal from the call-originating terminal;
    converting the binary SIP message received from the call-originating terminal into a standard full SIP message by a proxy server managing the call-originating terminal; and
    routing the standard full SIP message to a group talk server (GTS), and
    wherein the step of receiving the response message of the call-incoming terminal further comprises converting the response message from a standard full SIP type into a binary SIP type if the call-originating terminal is in a dormant state.

2. The method according to claim 1, wherein the binary SIP message is structured to have a minimal size to be transmitted through the SDB.

3. The method according to claim 1, wherein the signaling message is received through an access channel.

4. The method according to claim 1, wherein the step of setting up the traffic channel of the call-originating terminal further comprises a sub-step of routing the standard full SIP message to a media resource control server (MRC).

5. The method according to claim 4, wherein the response message to the signaling message is a message of a standard full SIP type message transmitted from the MRC if a connection is made between the call-originating terminal and the MRC.

6. The method according to claim 1, wherein the call-incoming terminal tries an origination to set up the traffic channel of the call-incoming terminal, the call-originating terminal having received the standard full SIP message converted into the binary SIP message under dormant state.

7. The method according to claim 1, further comprising a step that the call-originating terminal starts a data transmission while the call-incoming terminal is being set up.

8. The method according to claim 7, further comprising a step that the call-incoming terminal receives and plays the data when the traffic channel of the call-incoming terminal is activated while the call-originating terminal transmits the data.

9. A system for a call set-up between mobile communication terminals, comprising:
    a call-originating base station and first proxy server to receive a signaling message for a call set-up with a call-incoming terminal from a call-originating terminal, to receive a first origination signal for a set-up of a traffic channel from the call-originating terminal after receiving the signaling message, and to set up the traffic channel of the call-originating terminal depending on the first origination signal;
    a call-incoming base station and second proxy server to transmit the signaling message to the call-incoming terminal, to receive a response message to the signaling message from the call-incoming terminal, to receive a second origination signal for a set-up of a traffic channel from the call-incoming terminal after receiving the response message, and to set up the traffic channel of the call-incoming terminal depending on the second origination signal; and
    a group talk server (GTS) to intermediate between the call-originating base station and first proxy server and the call-incoming base station and second proxy server, and to transmit/receive the signaling message and the response message,
    wherein the signaling message transmitted from the call-originating terminal is a binary session initiation protocol (SIP) message comprising information about Method (MT), Application ID (AP), and Service Type (ST) for Push-To-Talk session,
    the first proxy server converts the binary SIP message sent from the call-originating terminal into a standard full SIP message, and then transmits the standard full SIP message to the GTS, and
    wherein the first proxy server converts the response message of the call-incoming terminal from a standard full SIP type into a binary SIP type if the call-originating terminal is in a dormant state.

10. The system according to claim 9, wherein the call-incoming base station and second proxy server converts the standard full SIP message into a binary SIP message to transmit to the call-incoming terminal.

11. The system according to claim 9, further comprising a media resource control server (MRC) to receive the standard full SIP message from the GTS and to transmit the response message to the GTS.

* * * * *